(No Model.) 3 Sheets—Sheet 3.
E. WALKER & D. WILLIAMS.
MACHINE FOR MAKING COTTON BATTING.
No. 390,923. Patented Oct. 9, 1888.
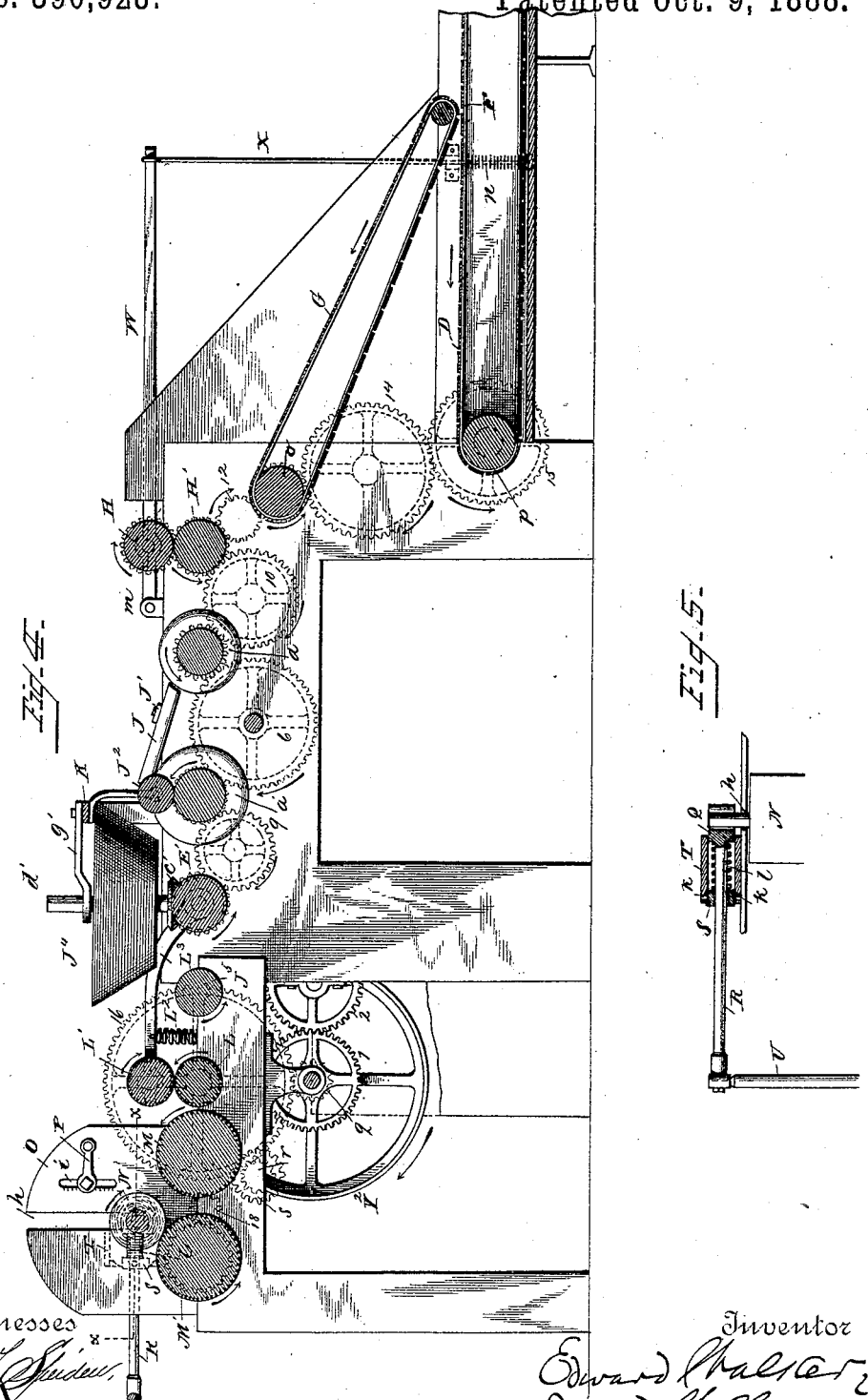

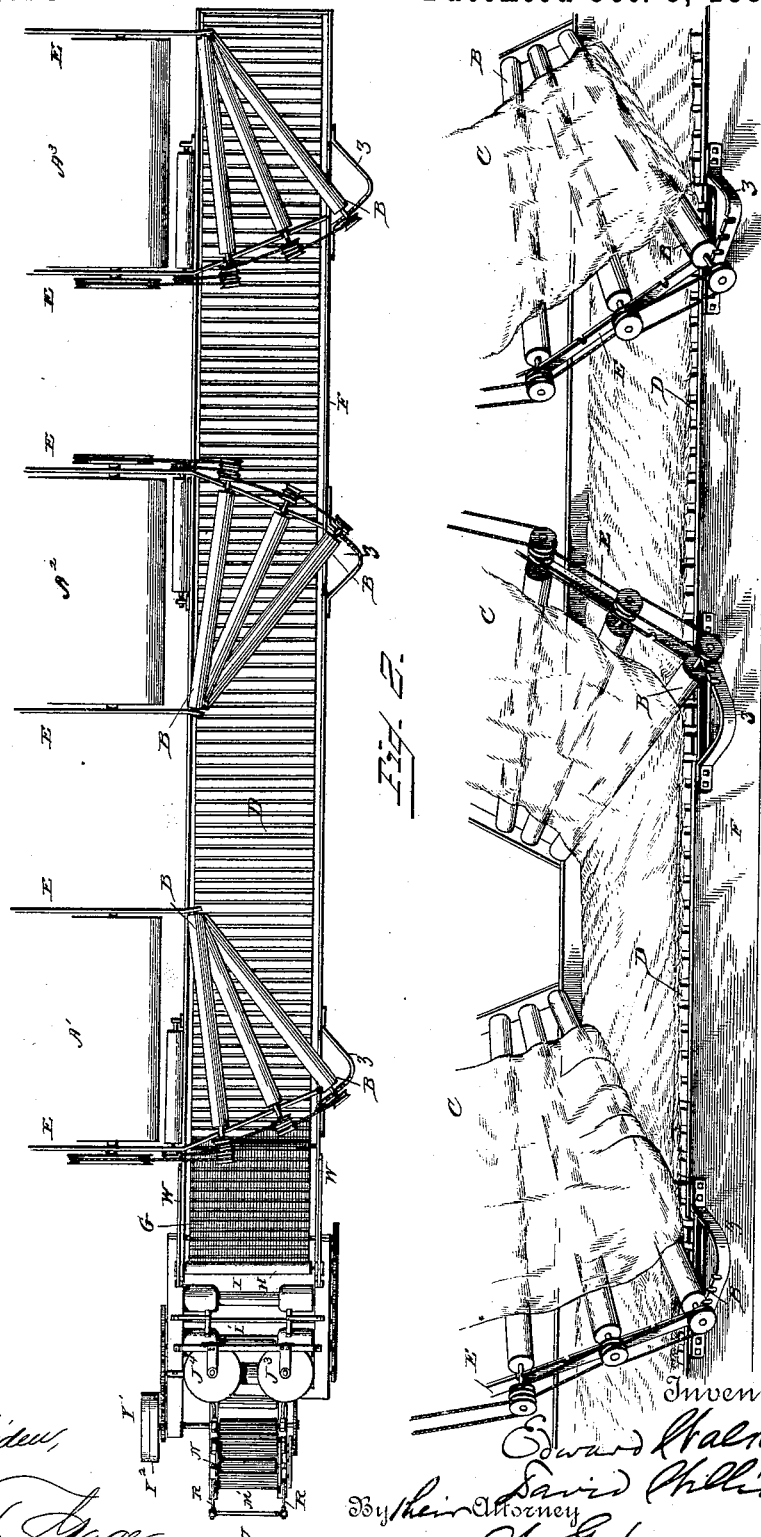

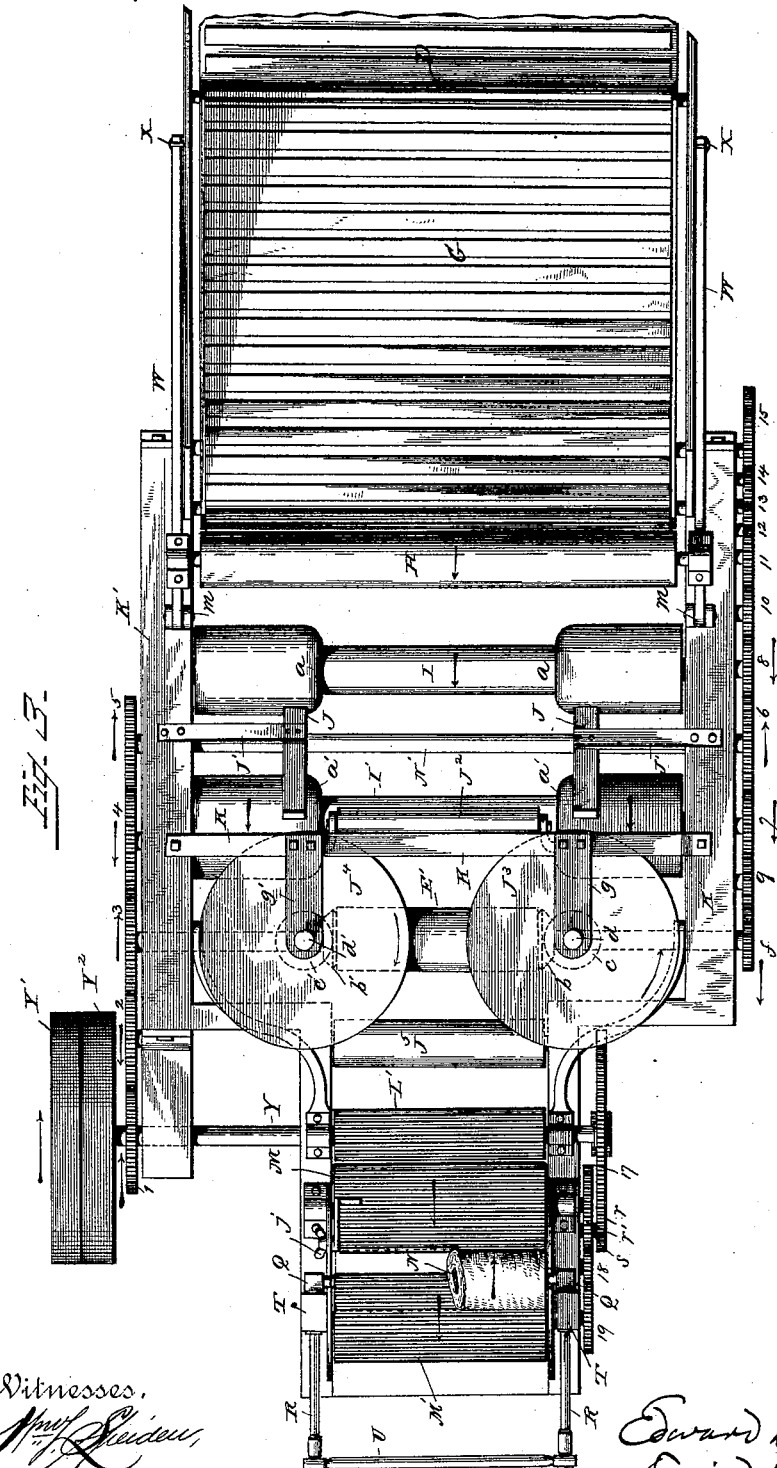

UNITED STATES PATENT OFFICE.

EDWARD WALKER AND DAVID WILLIAMS, OF COHOES, NEW YORK.

MACHINE FOR MAKING COTTON-BATTING.

SPECIFICATION forming part of Letters Patent No. 390,923, dated October 9, 1888.

Application filed March 24, 1887. Serial No. 232,293. (No model.)

*To all whom it may concern:*

Be it known that we, EDWARD WALKER and DAVID WILLIAMS, citizens of the United States, residing at Cohoes, in the county of Albany and State of New York, have invented certain new and useful Improvements in Machines for Making Cotton-Batting; and we do hereby declare the following to be a full, clear, and exact description of the invention, such as will enable others skilled in the art to which it appertains to make and use the same.

Our invention relates to a machine for making cotton bats, and has for its object to provide a machine in which the cotton will pass from the cards onto an apron traveling in front of and across the cards, preferably at right angles thereto, onto which apron the cotton is fed in layers, and, preferably, so that the fibers of one layer will cross those of another, the layers of cotton being passed from said apron to a "head," where the layers will be folded, then crimped, rolled, and automatically weighed, or the quantity determined; and to the accomplishment of such objects so generally stated the invention consists in the construction, combination, and arrangement of parts, hereinafter particularly described, and afterward specifically defined by the claims, reference being had to the accompanying drawings, forming part hereof, in which—

Figure 1 is a plan of the machine with a part of each card omitted. Fig. 2 is a perspective of Fig. 1, omitting the head and the parts of the cards shown in Fig. 1 and adding the cotton. Fig. 3 is a plan of the head on an enlarged scale. Fig. 4 is a longitudinal section of the same. Fig. 5 is a horizontal section of a detail on line $x$ $x$ of Fig. 4, parts being in elevation.

In the drawings, the letters $A'$ $A^2$ $A^3$ designate a series of carding-machines of any approved general construction and operating in the ordinary well-known way, a more particular description thereof being unnecessary.

We have shown three carding-machines; but the number may be varied. These cards have the delivering-rolls B arranged so that instead of discharging the cotton directly to the front of the card in the line of travel of the cards they deliver at an oblique or other angle thereto, so that when a series of machines are arranged to deliver and lay the cotton in layers the fibers of the layers will lie across each other instead of parallel with the length of the web or bat. To illustrate, it will be seen on reference to Fig. 1 that the card $A^3$ delivers the cotton, C, onto the traveling apron D at an oblique angle to the line of travel of the apron, with the line of inclination or obliquity extending from the inner to the outer edge of the apron in the direction of the line of travel of the apron, which causes the length of the fibers to lie obliquely across the apron. The card $A^2$ delivers in the opposite direction to card $A^3$, with the line of obliquity extending from the outer to the inner edge of the apron in the direction of the line of travel of the apron, which causes the fibers to lie across the apron in the opposite direction to the fibers of the first layer. The card $A'$ delivers in the same direction as card $A^3$, which causes the fibers of its layer to lie across the apron in the same line of obliquity as those of the first layer and across the middle layer in the opposite direction to the line of delivery of said layer. The consequence is that the bat is formed of layers of fibers which cross each other, with the effect of making a smooth and stronger web.

It is obvious that instead of arranging the delivery-rolls to deliver as described they might lie parallel with the doffers and the cards be set at such angle to deliver in the same way; but it is more desirable to have the cards set as shown and the delivery-rolls arranged obliquely, as space is economized.

The means for supporting the delivery-rolls B are immaterial; but it is preferred to use the notched bars E, so that the rolls may be adjusted to change their obliquity. It will be observed, too, that the endless apron D travels in the trough F at an angle—say a right angle—to the front of the cards, which permits the cotton to be formed in layers, the cotton from card $A^3$ being the first laid upon the apron, then the cotton from $A^2$ being laid upon it, and afterward cotton from card $A'$ laid upon that from $A^2$. This arrangement permits the bat to be formed in layers in a simple and expeditious manner, and by moving the apron faster or slower, as desired, the bat will be formed thinner or thicker, as wanted.

Another advantage in having the apron travel in front of the cards, as described, and of forming the bat or web in layers is that the finest or best cotton can be used for the outside of the bat or web and not so good a grade of stock for the inner layers, so that the appearance and advantage of having a bat with the best stock on the outside or side exposed to wear is obtained at a saving of stock and expense. This best stock will be on both sides of the web, because the web will be folded; and, assuming that the best stock from card A³ is laid upon the apron with a width of thirty-four inches and the other layers upon that, the web can be folded from the bottom from both edges toward the middle, so as to form a bat of the width of fifteen inches with a lap at the meeting edges of four inches, and thus bring the best stock to cover both the top and bottom and edges of the web.

The traveling apron may be moved by shafts and gear-wheels, as hereinafter described, or pulleys and belts applied in any manner occurring to the mechanic.

The bat or web formed into layers, as described, will pass from the forming-apron described onto a shorter apron, G, inclining upwardly from the end of the forming-apron to a point in front of the compressing-rolls H and H'. The web is caught at the upper end of the delivery-apron G by the rolls H and H', and by them drawn between them, which rolls act as calender-rolls and serve to compress the web and feed it to the forming-rolls I and I', which rolls, as will be observed, are reduced in diameter between their ends, so as to form shoulders $a$ and $a'$, which, when the web comes in contact therewith, raise or lift the web at opposite edges, so as to form a partial fold. As the web is raised by striking the shoulders $a$, it passes under the smooth and rounded blocks J, held by arms J' in such position, as shown, that they will guide the raised sides farther inwardly, so that when they strike the shoulder $a'$ and pass under the roll J² and to the two revolving cones J³ and J⁴ said cones will turn down the two inwardly-folded edges or laps and complete the web and make the web smooth before it passes over the carrying-roll J⁵ to the crimpers. These cones travel faster than the web and are revolved by means of bevel-pinions $b\ b'$, meshing with bevel-pinions $c\ c'$ on the shafts $d\ d'$ of the cones. The pinions $b\ b'$ are on a horizontal shaft, E', which has a gear, $f$, on one end meshing with other gears through which power is derived. The shaft is preferably of enlarged circumference at its middle, so as to serve as a carrier for the bat. The cones J³ and J⁴ are supported at their upper ends by means of arms $g\ g'$, extending out from a cross-bar, K, suitably supported upon the frame K'. The web, after leaving the cones J³ and J⁴, passes between the fluted rolls L and L' and is by them finely crimped. The rolls L and L' are geared to revolve together, and the roll L' may be weighted or pressed down to give the required crimp by suitable means—for instance, by a spring, L², connected to the journal-bearing arms L³, so as to draw down the roll, the journal-arms being pivoted or journaled to turn on shaft E'. The web passes from the crimping-rolls over the fluted rolls M and M', which move forward the web to the spindle N, journaled loosely in slots $h$, formed in the upright standards O, so as to be free to move up and down therein. As this spindle revolves, which it does by frictional contact between it, the web, and the roll M', the web is wound around the spindle, and when enough of the batting has been wound around it to come against the stud P the required weight has been reached and the spindle and roll of batting are removed, when the spindle is withdrawn from the roll of batting and immediately replaced to have more batting wound around it.

The stud P is adjustable in a slot, $i$, formed in one of the upright standards, and is held to its adjustment by a thumb-nut, $j$, screwed onto the threaded portion of the stud. The stud is preferably made in crank form, as shown. The stud is adjusted along the scale, extending lengthwise of the slot, the adjustment depending on the weight of the stock which may be running through the machine. After ascertaining the weight and adjusting the stud, the roll when it strikes against the stud will be completed and ready for removal. When that stage is reached, the attendant breaks or severs the web, so as to remove the roll and permit the replacing of the spindle, after which the attendant starts the web around the spindle, and it then works mechanically to form another roll of batting.

The spindle N projects through the slots $h$ in the standards O and its ends fit into semicircular recesses in the two boxes Q on the ends of the levers R. These levers pass loosely through plates S, which are pivoted or swung by pins $k$, journaled in bearings T, connected to the sides of standards O, so that the boxes in which the ends of the spindle fit can rise and fall as there is more or less batting on the roll without binding against the walls of the slot. The levers are connected together at their outer ends by a cross-bar, U, and their purpose is to enable an attendant by pressure on them to keep the spindle-roll in contact with the fluted roll, so that by friction the spindle will be turned and the cotton-batting smoothly rolled thereon. When the spindle and its batting-roll are to be removed, the levers are pulled out, so as to take the boxings from the spindle, when the latter can be lifted out. Springs $l$, which bear at one end against the plates S and at the other end against the boxes, are compressed when the levers are drawn out, and when the pressure is relieved the expansion of the springs carries the boxings and levers back to their normal positions.

The upper calender-roll, H, is journaled in boxes secured to the levers W, which are fulcrumed at one end at $m$ and at their free end are connected by rods X to the trough F. The connection of the rods to the trough is such as to permit the rods to move vertically, and said rods are under the influence of springs n, which exert a downward pull on the rods, so as to weight or press down the upper calender-roll.

Particular attention is directed to the notched bracket or support 3, which projects from the trough F, and in which the outer end of the lower roll to the card A³ rests. Previous to the adoption of this bracket it was difficult to feed from this card A³, which furnishes the layer that is to be the outside covering of the bat, so as to have the apron covered its entire width with the cotton, as the cotton would pucker or fall in folds and have thick and thin places, so that the bat was not uniformly covered with the better stock. That difficulty is overcome by the use of the bracket, as the roll extends beyond the side of the apron and permits the whole width of the latter to be covered. The roll is adjustable in the bracket, because sometimes the stock is highly bleached and very light and it is desirable to have the roll so that it can be adjusted according to the stock used. The brackets are shown as also applied to the cards A² and A'; but such is not necessary, and it may be best not to have them to any other than the first feeding-card, A³.

The main drive-shaft Y has upon it a loose pulley, Y', and tight pulley Y², so that the drive-belt can be shifted from one to the other to stop or start the machine. Motion is transmitted from a gear, 1, on the main shaft through a train of idlers, 2, 3, and 4, to the gear 5 on the shaft N', and through a gear, 6, on that shaft to gears 7 and 8 on the ends of rolls I and I', and from gear 7 through idler 9 to gear f. From gear 8 motion is transmitted through idler 10 to gear 11 on roll H', thence through idler 12 to gear 13 on the upper shaft, o, of endless apron G, and thence through idler 14 to gear 15 on the shaft p of endless apron D.

The main drive-shaft Y is also provided with a pinion, q, through which motion is transmitted to the gear 16 on the shaft of the roll L, thence to a pinion, r, on a shaft, s, projecting from the side of the machine, and through a larger pinion, r', on the same shaft to a gear, 17, on the shaft of roll M, and through an idler, 18, to a gear, 19, on the shaft of roll M'.

The bat from the apron D is directed onto the shorter apron, G, thence between the calender-rolls H H', from whence it passes onto the head and final roll-spindle, as hereinbefore set forth.

We do not claim herein the method of forming the bat, as the same forms the subject of our application, Serial No. 256,459, filed November 29, 1887, as a division and continuation of this application.

Having described our invention and set forth its merits, what we claim is—

1. The combination of a series of cards with an apron in front of the cards traveling transversely thereto and delivery-rolls inclined to deliver the cotton to the traveling apron in opposite directions, substantially as described.

2. The combination, with a series of cards, of an apron in front of the cards traveling transversely thereto and delivery-rolls to the cards arranged obliquely to the line of travel of the apron for obliquely feeding the cotton in consecutive layers to the apron, substantially as described.

3. The combination, with a traveling apron, of the revolving cones arranged opposite to each other to fold over upon itself a web of cotton delivered from the apron and passing between the cones, and means intermediate the cones and apron to lead the cotton from the apron to the cones, substantially as described.

4. The combination, with a traveling apron to carry a web of cotton, of forming-rolls enlarged toward their ends to raise opposite edges of the web of cotton passing across the same in the formation of a fold and means for folding a portion of the web over upon itself, substantially as described.

5. The combination of a traveling apron to carry a web of cotton, compressing-rolls to press the web passing through them, forming-rolls enlarged toward their ends to raise opposite edges of the web passing across them in the formation of a fold, and cones for folding a portion of the web over upon itself, substantially as described.

6. The combination of the revolving cones for folding over upon itself a web of cotton passing between them, crimping-rolls through which the web passes after leaving the cones, a spindle on which to wind the cotton web, and means for rotating said spindle, substantially as described.

7. The combination, with the spindle on which to wind a cotton web and means for rotating said spindle, of an adjustable stud supported adjacent to said spindle to indicate the quantity of cotton upon the spindle, substantially as described.

8. The combination, with a card and a traveling apron in front thereof, of delivery-rolls to deliver cotton from the card to the apron and a bracket or support, 3, extended beyond the edge of the apron, having the lower delivery-roll journaled at one end in said support, substantially as described.

9. The combination of the fluted rolls M M', the movable spindle N, the levers having boxes in which the spindle is journaled and adapted to be separated from the spindle, and springs for moving said levers to restore them to their normal position after they have been moved therefrom, substantially as described.

In testimony whereof we affix our signatures in presence of two witnesses.

EDWARD WALKER.
DAVID WILLIAMS.

Witnesses:
JOSEPH PAGE,
LEES WRIGLEY.